(12) United States Patent
Athley et al.

(10) Patent No.: US 9,521,631 B2
(45) Date of Patent: Dec. 13, 2016

(54) RADIO NETWORK NODE AND METHOD THEREIN

(75) Inventors: Fredrik Athley, Kullavik (SE); Mikael Coldrey, Landvetter (SE); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 328 days.

(21) Appl. No.: 14/369,313

(22) PCT Filed: Jan. 20, 2012

(86) PCT No.: PCT/SE2012/050048
§ 371 (c)(1),
(2), (4) Date: Jun. 27, 2014

(87) PCT Pub. No.: WO2013/109176
PCT Pub. Date: Jul. 25, 2013

(65) Prior Publication Data
US 2015/0003406 A1 Jan. 1, 2015

(51) Int. Cl.
*H04W 52/34* (2009.01)
*H04W 72/04* (2009.01)
(Continued)

(52) U.S. Cl.
CPC ......... *H04W 52/346* (2013.01); *H04B 7/0426* (2013.01); *H04B 7/0452* (2013.01);
(Continued)

(58) Field of Classification Search
CPC ........... H04W 52/346; H04W 72/0446; H04W 72/0453; H04W 72/0473; H04B 7/0426; H04B 7/0452; H04B 7/0465; H04B 7/0617; H04B 7/068; H04L 5/0023; H04L 5/0037
See application file for complete search history.

(56) References Cited

U.S. PATENT DOCUMENTS

2003/0181173 A1* 9/2003 Sugar ..................... H01Q 3/28
  455/126
2010/0285762 A1 11/2010 Ko et al.
(Continued)

FOREIGN PATENT DOCUMENTS

EP 1404066 A1 3/2004

OTHER PUBLICATIONS

International Search Report and Written Opinion for PCT/SE2012/050048 mailed Aug. 20, 2012, 11 pages.

*Primary Examiner* — Melvin Marcelo
(74) *Attorney, Agent, or Firm* — Patent Portfolio Builders, PLLC (57) ABSTRACT

Embodiments herein relate to a radio network node for scheduling a radio resource within a radio communications network. The radio network node comprises at least two antenna ports over which communication is performed using a respective power amplifier over each antenna port out of the at least two antenna ports. The radio network node determines a utilization factor of power of each power amplifier when a first user equipment is assigned to the radio resource. The radio network node further determines a utilization factor of power of each power amplifier when a second user equipment is assigned to the radio resource. The radio network node then schedules the first user equipment or the second user equipment to the radio resource based on the determined utilization factors.

30 Claims, 5 Drawing Sheets (51) Int. Cl.
*H04B 7/04* (2006.01)
*H04B 7/06* (2006.01)
*H04L 5/00* (2006.01)

(52) U.S. Cl.
CPC ........... *H04B 7/0465* (2013.01); *H04B 7/068* (2013.01); *H04B 7/0617* (2013.01); *H04L 5/0023* (2013.01); *H04L 5/0037* (2013.01); *H04W 72/0446* (2013.01); *H04W 72/0453* (2013.01); *H04W 72/0473* (2013.01)

(56) References Cited

U.S. PATENT DOCUMENTS

| | | | |
|---|---|---|---|
| 2010/0290382 A1 | 11/2010 | Hui et al. | |
| 2012/0329515 A1* | 12/2012 | Husted | H04W 52/226 455/552.1 |
| 2013/0182794 A1* | 7/2013 | Ringstrom | H04B 7/0434 375/297 |

* cited by examiner

RADIO NETWORK NODE AND METHOD THEREIN

This application is a 35 U.S.C. §371 national phase filing of International Application No. PCT/SE2012/050048, filed Jan. 20, 2012, the disclosure of which is incorporated herein by reference in its entirety.

TECHNICAL FIELD

A radio network node and a method therein. In particular, embodiments herein relate to scheduling a radio resource in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio network nodes such as radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio network node and are communicating with respective radio network node. The user equipments transmit data over an air or radio interface to the radio network node in uplink (UL) transmissions and the radio network nodes transmit data over an air or radio interface to the user equipments in downlink (DL) transmissions.

In for example 3rd Generation Partnership Project (3GPP) LTE, transmission gain is increased using transmission diversity and beamforming transmission. The benefits of beamforming are to increase the received signal gain, by making signals emitted from different antennas add up constructively, and to reduce the multipath fading effect. Adaptive transmit beamforming in the radio communications network aims at maximizing the power received by the intended user equipment while at the same time minimizing the interference transmitted to other user equipments. Closed form solutions for the optimal transmit antenna weights may in many cases be found if one puts a constraint on the total transmitted power at the radio network node in the optimization, e.g. zero-forcing beamforming. For zero-forcing beamforming in downlink, an algorithm allows the radio network node to send data to the desired user equipments together with nulling out a direction to undesired user equipments; and for uplink, the radio network node receives from the desired user equipments together with nulling out the directions from the interference user equipments.

A more relevant constraint for practical radio communications networks is to set a limit on the maximum power that each Power Amplifier (PA) may deliver. However, this leads to a more complicated optimization problem which typically does not have a closed form solution. Therefore, one has to resort to numerical optimization which may render a real-time application of the method impractical.

A problem with existing solutions is that the optimal weights do not have equal amplitude which will lead to poor utilization of the available PA resources. In most radio network node architectures the relevant constraint is on the maximum power transmitted from one radio branch, rather than on the total transmitted power. This means that if the transmit weights do not have equal amplitude, some of the radio branches will not transmit with full power. The PAs in these branches will then also work at a load where they have poor efficiency. This results in a reduced performance of the communication within the radio communications network.

SUMMARY

An object of embodiments herein is to improve the performance of a radio network node using at least two antenna ports in a radio communications network.

According to an aspect the object is achieved by embodiments herein disclosing a method in a radio network node for scheduling a radio resource within the radio communications network. The radio network node comprises at least two antenna ports over which communication is performed using a respective power amplifier over each antenna port out of the at least two antenna ports. The radio network node determines a utilization factor of power of each power amplifier when a first user equipment is assigned to the radio resource. The radio network node further determines a utilization factor of power of each power amplifier when a second user equipment is assigned to the radio resource. The radio network node then schedules the first user equipment or the second user equipment to the radio resource based on the determined utilization factors.

According to another aspect the object is achieved by embodiments herein by the radio network node for scheduling the radio resource within the radio communications network. The radio network node comprises at least two antenna ports over which communication is to be performed using a respective power amplifier over each antenna port out of the at least two antenna ports. The radio network node further comprises a determining circuit configured to determine the utilization factor of power of each power amplifier when a first user equipment is assigned to the radio resource. The determining circuit is further configured to determine the utilization factor of power of each power amplifier when the second user equipment is assigned to the radio resource. The radio network node also comprises a scheduler configured to schedule the first user equipment or the second user equipment to the radio resource based on the determined utilization factors.

Embodiments herein utilize a frequency selectivity and/or a time variation of a radio channel in order to improve the power amplifier utilization. This is accomplished by taking the utilization factor of the power amplifiers into account when scheduling user equipments.

BRIEF DESCRIPTION OF THE DRAWINGS

Embodiments will now be described in more detail in relation to the enclosed drawings, in which.

DETAILED DESCRIPTION

Figure 1:
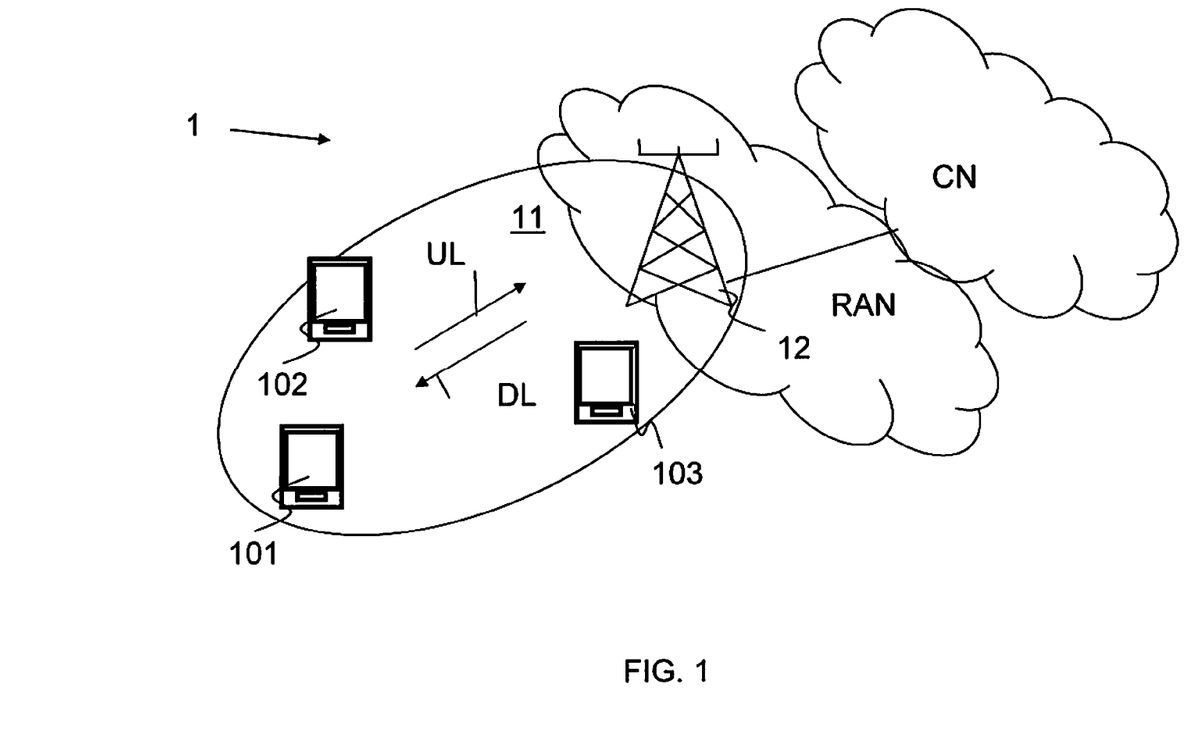
FIG. 1 is a schematic overview depicting a radio communications network according to embodiments herein.

FIG. 1 is a schematic overview depicting a radio communications network 1 according to embodiments herein. The radio communications network 1 may be an LTE-advanced network, an LTE network, Universal Terrestrial Radio Access Network (UTRAN)-General Packet Radio Service (GPRS) network, a WCDMA network, a Code Division Multiple Access (CDMA) 2000 network, an Interim Standard 95 (IS-95) network, a Digital-Advanced Mobile Phone Service (D-AMPS) network but is exemplified below as an LTE network.

The radio communications network 1 comprises a radio network node 12 exemplified in FIG. 1 as a radio base station in a Radio Access Network (RAN). The RAN provides access to a Core Network (CN). The radio network node 12 serves or controls radio resources over a geographical area forming a cell 11.

User equipments, a first user equipment 101, a second user equipment 102, and a third user equipment 103, are served in the cell 11 by the radio network node 12. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell. The radio network node 12 may, as stated above, be a radio base station, also be referred to as e.g. a NodeB, an evolved Node B (eNB, eNode B), a base transceiver station, Access Point Base Station, base station router based on the radio access technology and terminology used, but may also be a beacon node, a relay node or any other network unit capable to communicate with a user equipment within the cell 11.

The radio network node 12 comprises at least two antenna ports, where each antenna port is connected to one or several antenna radiation elements and is powered by a Power Amplifier (PA) according to a beamforming weight of the antenna port. Beamforming weight is a complex valued amplitude and may also be referred to as antenna port weight. Embodiments herein schedule radio resources, e.g. difference frequency sub-bands, time slot of sub-bands or similar, to each user equipment based on a utilization factor of power of each power amplifier of respective user equipment. Thus, the scheduling utilizes frequency selectivity and/or a time variation of a radio channel, as the beamforming weights are updated according to the state of the radio channel, in order to improve the power amplifier utilization.

An antenna port may in some embodiments correspond to a separate transmit antenna. Additionally or alternatively, an antenna port may correspond to a particular set of beamforming weights for a subset of physical transmit antennas. Then different antenna ports correspond to different sets of beamforming weights and a signal that is transmitted through one antenna port may be transmitted through multiple antennas. Measurements of the downlink channel conditions, instantly or continuously, may be used to determine the beamforming weights. The beamforming weights in adaptive beamforming are generally not constant modulus, i.e. different beamforming weights may have different amplitudes. Examples of such adaptive transmit beamforming schemes are zero-forcing beamforming and eigenbeamforming. Since the beamforming weights are derived from an estimation of a channel, i.e. a channel estimation, the beamforming weights will be frequency dependent if the channel is frequency selective. If frequency domain channel dependent scheduling is employed this may be utilized for equalizing the differences in transmit power between the antenna ports, may also be referred to as radio branches.

An example is where M user equipments are to be scheduled in N frequency sub-bands, where N<M. Channel dependent beamforming is to be used to transmit the user data to all user equipments. Let $w_k(f_n)$ denote the beamforming weight for the k-th radio branch in frequency sub-band n. If equal power is assigned to each frequency sub-band, a total power, $P_k$, that the PA in the k-th radio branch shall deliver is related to $$P_k = \sum_{n=1}^{N} |w_k(f_n)|^2$$

That is, the total power $P_k$ is the sum of beamforming weights squared. Now, if all $P_k$:s are different and all PAs have the same maximum output power, only one PA is able to transmit full power. This means a reduction in total output power and a loss in performance compared to the case where all $P_k$:s are equal. This also means that the sum power constraint posed in the original beamforming weights derivation has not been reached by the final solution, due to the practical limitations of PAs. An obvious solution to this problem may be to just use PAs with higher maximum output power in order to reach the target total transmit power. A drawback with the solution of transmitting with a higher maximum output power, besides a potential over-dimensioning of PAs, is that some PAs in this case would operate at low load where they typically have poor efficiency. This would then translate to a higher required input power to the reach the target output power. The reason for the low efficiency of a PA at low load can be explained by a typical relationship between input and output power for a PA. The PA consumes some power, $P_0$, even when it is idle. Therefore, the ratio output/input power will be lower at low load.

A solution according to embodiments herein takes PA utilization of each power amplifier, and thereby also PA efficiency, into account in the scheduling of a user equipment. Embodiments disclosed herein lead to a more even distribution of the transmitted power from different PAs in a multi-antenna system. A more even distribution of the transmitted power over the individual PAs means that all PAs may run with full, or closer to full, power which maximizes the total transmitted power. This gives increased system throughput and also increases the energy efficiency of the system since the PAs are working at an operating point, closer to its maximum, with higher efficiency. Further improvements in energy efficiency may be achieved by interchanging system throughput and energy efficiency through Discontinuous Transmission (DTX), as the DTX periods may be longer due to the higher throughput. Embodiments herein thus provide an improved spectral efficiency, which means that a given number of bits may be transmitted over a shorter period of time and the radio network node 12 may be idle the remaining time, leading to reduced energy consumption. Furthermore, a reduced variability in required power from different PAs may reduce problems associated with clipping and high peak-to-average-power ratio of the transmitted signal.

Figure 2:
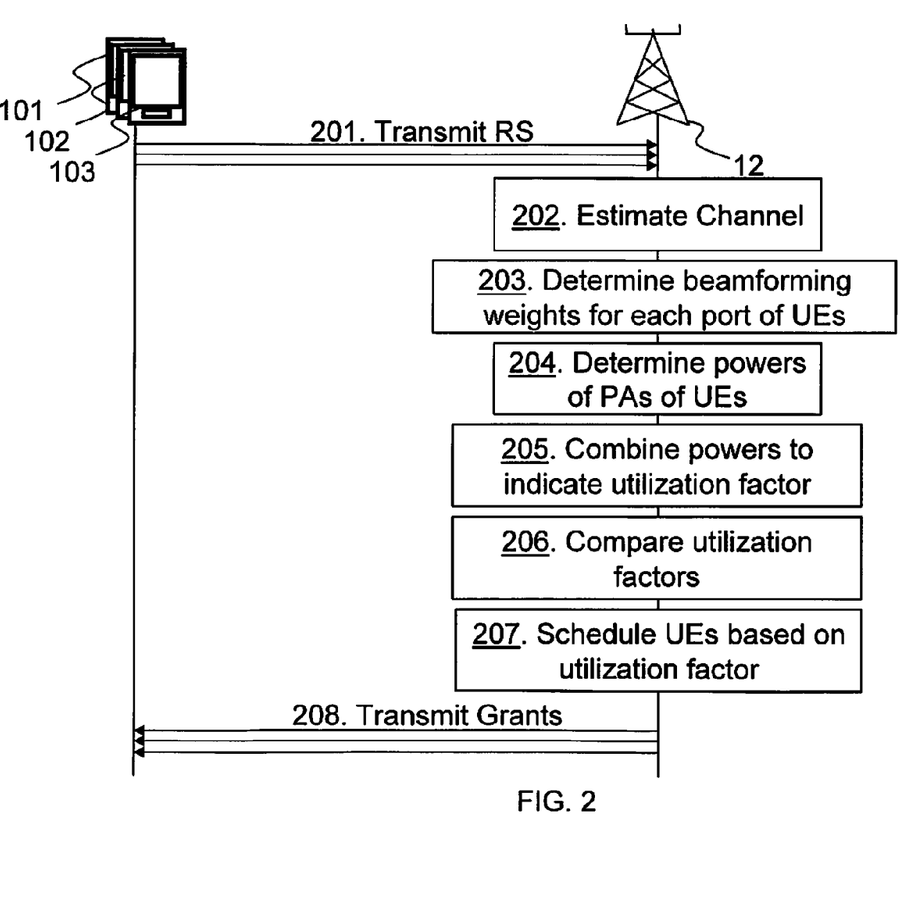
FIG. 2 is a schematic combined flow chart and signalling scheme according to some embodiments herein.

FIG. 2 is a schematic combined flowchart and signalling scheme according to some embodiments depicting a scheduling for beamforming transmission.

Action 201. The different user equipments transmit signals, e.g. reference signals, to the radio network node 12.

Action 202. The radio network node 12 estimates, continuously, channel quality over each antenna port for each radio resource of each user equipment 101,102,103, respectively. The channel quality may be defined as complex channel coefficients, and/or a covariance matrix of a channel matrix. The channel quality differs due to location of the user equipment 101,102,103 within the cell based on fading, gain, and similar. The radio resource may be a radio resource out of at least two radio resources, such as a first and a second radio resource wherein the radio resource is a frequency sub-band or a time slot of a frequency sub-band or a total bandwidth.

Action 203. The radio network node 12 then determines beamforming weights for each antenna port, for each radio resource, and for each user equipment 101, 102, 103 that may be scheduled in that radio resource based on the determined channel quality.

Action 204. From the beamforming weights, the radio network node 12 determines powers of the PAs of the radio network node for different assignments of the user equipments 101,102,103 to radio resources. The powers are determined from the beamforming weights squared of each antenna port.

Action 205. The radio network node 12 then combines the powers of PAs of the radio network node 12 when user equipment is assigned to the first radio resource with powers of PAs of the radio network node 12 when user equipment assigned to the second radio resource. This is done for all or parts of all possible different assignments. The combination indicates the utilization factor of power of the PAs for each possible assignment of UEs to radio resources.

Action 206. The radio network node then compares the different utilization factors of the PAs when having different user equipments 101,102,103 assigned to different radio resources.

Action 207. The radio network node 12 schedules the different user equipment 101,102,103 to the radio resources according to the combination that resulted in a utilization factor that indicated all the PAs to be utilized more evenly than utilization factors of other combinations. It should here be noted that several user equipments may be scheduled on the same radio resource, e.g. Multi User Multiple Input Multiple Output (MU-MIMO) or Space-Division Multiple Access (SDMA). Furthermore, the same user equipment 101,102,103 may be scheduled on all radio resources.

Action 208. The radio network node 12 then transmits grants to the different user equipment 101,102,103 according to the scheduling.

In order to get a rough estimate of the gains that may be achieved with embodiments herein, consider the following simple calculations. A maximum power of one PA is set in this example to 1 W. The total power for each antenna port using a beamforming scheme is calculated by summing the powers of the beamforming weights over all radio resources. These total powers are then normalized by division with the largest total power so that at least one PA transmits with full power. The total power transmitted by the radio network node 12 is then obtained by summing the power of beamforming weights from all antenna ports. If one is able to obtain an even distribution of power over e.g. four antenna ports, the total transmitted power of the base station will thus be 4 W. If the distribution is uneven, some PAs will not transmit full power and the total transmitted power of the radio network node 12 will be reduced.

The loss in transmission power if no consideration is taken in PA utilization may lie in the range of about 0-3 dB when the scheduler shall assign a user equipment 101,102, 103 every tenth resource block in the frequency domain, with a typical value in the order of 0.6 dB.

Figure 3:
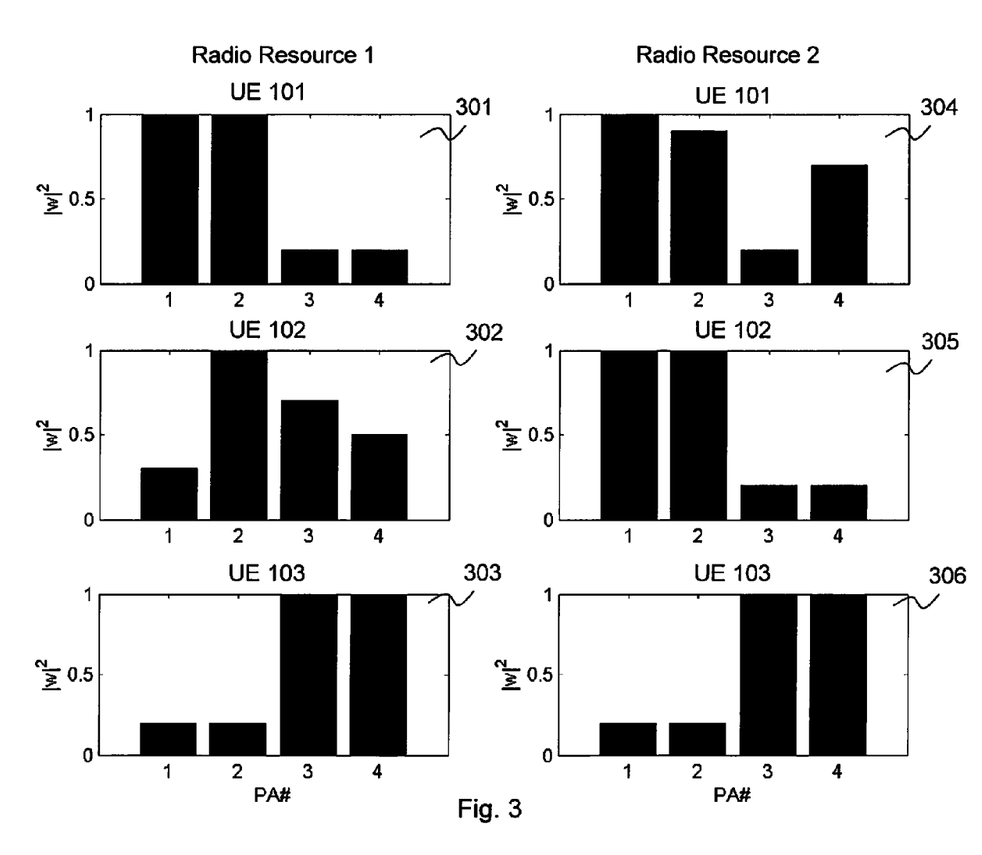
FIG. 3 is depicting schematic diagrams indicating power of beamforming weights for different users in two different frequency sub-bands.

FIG. 3 is illustrating diagrams indicating powers of beamforming weights for user equipments. The beamforming weights squared ($|w|^2$) indicating powers of the different PAs are defined along a y-axis. The different PAs are defined along an x-axis as numbers 1, 2, 3 and 4. Scheduling decisions according to embodiments herein are based on a priority function that depends on predicted user performance, e.g. Signal to Interference plus Noise Ratio (SINR) or user throughput. The proposed solution may be combined with many prior art scheduling methods such as a proportional fair scheduling, Maximum Carrier to Interference scheduling, or a Fair Channel Dependent Scheduling.

The method is now described by an example in order to explain the principle. The downlink scheduling decision may be based on the predicted SINR for the user equipment. Furthermore, in the example there is no intra-cell interference and there is only single-layer, i.e. rank-one, beamforming. If the power limitation of the individual PAs is not taken into account, the downlink SINR for user n is given by $$SINR_n = \frac{P_n G_n}{\sum_{m \neq n} P_m G_m + N},$$

Where: $P_n$ is a nominal total power transmitted to user equipment n, nominal total power as opposed to actual total power that can be delivered by the PAs when taking its limitations into account; $G_n$ is a path gain (antenna gain/path loss) between the radio network node 12, such as a serving base station, and user equipment n; and N is the thermal noise. The sum in the denominator is the interference from other radio network nodes, that is, $P_m$ is the total power transmitted of other base station m, $G_m$ is a path gain (antenna gain/path loss) between the radio network node 12 and the radio network node m.

Two of the different user equipments 101-103 are to be scheduled in a same time slot but in two different frequency sub-bands, denoted herein as a radio resource 1 and a radio resource 2. Furthermore, the radio network node 12 may comprise four transmit antennas and that the power of the beamforming weights for the different user equipments 101,102,103 in the different frequency sub-bands are given according to the diagrams. The power of the beamforming weights has been normalized so that the maximum power of the beamforming weights is 1. The power of the beamforming weights is the beamforming weights squared or as stated above the absolute value of complex amplitude squared. Diagram 301 illustrates powers when the first user equipment 101 is assigned to the radio resource 1. As indicated the PA1 and PA2 use a power of 1 and PA3 and PA4 use a power of 0.2. Diagram 302 illustrates powers when the second user equipment 102 is assigned to the radio resource 1. As indicated the PA1 uses a power of 0.3; the PA2 uses a power of 1, PA3 uses a power of 0.7 and PA4 uses a power of 0.5. Diagram 303 illustrates powers when the third user equipment 103 is assigned to the radio resource 1. As indicated the PA1 and PA2 use a power of 0.2 and PA3 and PA4 use a power of 1. Diagram 304 illustrates powers when the first user equipment 101 is assigned to the radio resource 2. As indicated the PA1 uses a power of 1; the PA2 uses a power of 0.9, PA3 uses a power of 0.2 and PA4 uses a power of 0.7.

Diagram 305 illustrates powers when the second user equipment 102 is assigned to the radio resource 2. As indicated the PA1 and PA2 use a power of 1 and PA3 and PA4 use a power of 0.2. Diagram 306 illustrates powers when the third user equipment 103 is assigned to the radio resource 2. As indicated the PA1 and PA2 use a power of 0.2 and PA3 and PA4 use a power of 1.

If the first user equipment 101 is scheduled in the radio resource 1 and the second user equipment 102 in the radio resource 2, the total power over the two radio resources is [1 1 0.2 0.2]+[1 1 0.2 0.2]=[2 2 0.4 0.4], where each element in a row-vector is the power that corresponding PA needs to deliver. As an example, each PA deliver maximum 1 W, the beamforming weights must be re-normalized so that the powers become [2 2 0.4 0.4]/2=[1 1 0.2 0.2]. The total power that may be delivered by all 4 PAs is then 1+1+0.2+0.2=2.4, which is only 2.4/4=60% of the power that would be possible if all PAs transmitted full power. The required power reduction in the own cell 11 may be divided equally among the user equipments 101,102,103 and the interference from other radio network nodes is constant, the SINR will be reduced by 40% when taking the power limitation of the PAs into account.

If the third user equipment 103 had been scheduled in the radio resource 2 instead of the second user equipment 102, the total power over the two radio resources would be [1 1 0.2 0.2]+[0.2 0.2 1 1]=[1.2 1.2 1.2 1.2]. In this case the beamforming weights have to be re-normalized so that the powers become [1.2 1.2 1.2 1.2]/1.2=[1 1 1 1]. This means that all PAs transmit with full power. The total transmitted power would then be 4 W, and there is no SINR reduction due to some PAs not transmitting full power.

A point to make is that the beamforming weight normalization may not be calculated a priori since it depends on the scheduling decisions, i.e. which user equipment 101-103 is assigned to e.g. which frequency sub-band. Thus, different assignments of user equipment 101-103 to radio resources lead to different PA utilization. For each candidate of scheduling decision, the required beamforming weight normalization and its impact on SINR is computed. When this has been calculated for all candidates or combinations, a final scheduling decision is made.

This example shows that if the SINR is calculated according to embodiments herein, scheduling decisions that lead to poor PA utilization will be punished since the SINR will be reduced. Using the proposed method, when calculating the scheduling priority function, will lead to an improved PA utilization. The benefits of this are two-fold:

Increased performance since the total transmitted power is higher compared to prior art solutions where the effect of limited PA power is not taken into account.

Increased energy efficiency since the PAs operate at a load where the PAs have higher efficiency.

In the example, SINR was used as performance metric but the proposed method may be extended to other metrics, e.g. user data throughput.

In some embodiment the proposed method may be combined with some scheduling method that is not based on predicted user performance, such as a Round Robin scheduling method. A scheduler may in these embodiments determine which user equipment 101-103 that should be scheduled in e.g. frequency sub-band 1 and 2, respectively, without taking any predicted user performance into account. A Round Robin-like scheduler would then just assign radio resources, such as resource blocks, to user equipment 101-103 so that each user equipment 101-103 gets an equal amount of radio resources. The resulting PA utilization will depend on in which way this assignment is made. The user equipment 101-103 may get equal amount of resource blocks in different ways by picking different combinations of user equipments and frequency sub-bands. The idea of some embodiments herein is to choose the combination that is the most energy efficient, measured in terms of PA utilization. PA utilization that takes into account all utilization factors of respective PA may be quantified by, e.g., the following metric $$\eta = \frac{1}{KN} \sum_{n=1}^{N} \sum_{k=1}^{K} |w_k(f_n)|^2,$$

where it is assumed that the beamforming weights are normalized such that $$\max_{k} |w_k(f_n)| = 1,$$

$\forall n$. The maximum value of PA utilization $\eta$ is 1, which means that all PAs transmit with full power. This metric may be computed for each combination of user equipments and frequency sub-bands, and the combination that gives the highest value is then chosen. If other factors are important for the scheduling decisions, PA utilization may be combined with other metrics to form an aggregated metric.

An example with single-layer beamforming and frequency domain scheduling has herein been described, a similar solution may applied to other problems. For example: applied to Multi-layer beamforming, where a similar approach as in single-layer beamforming is used; applied to MU-MIMO, wherein a set of user equipments 101-103 is scheduled simultaneously in the same frequency band and PA utilization may then be taken into account when determining which combination of user equipments 101-103 to transmit to in a particular frequency band; applied to any application where transmit beamforming with non-constant modulus beamforming weights together with some scheduling is used. It may also be applied to time domain scheduling by taking PA utilization into account when determining which user equipment 101-103 to schedule in each time slot. Also, the approach may also be applied to joint frequency-time domain scheduling.

Figure 4:
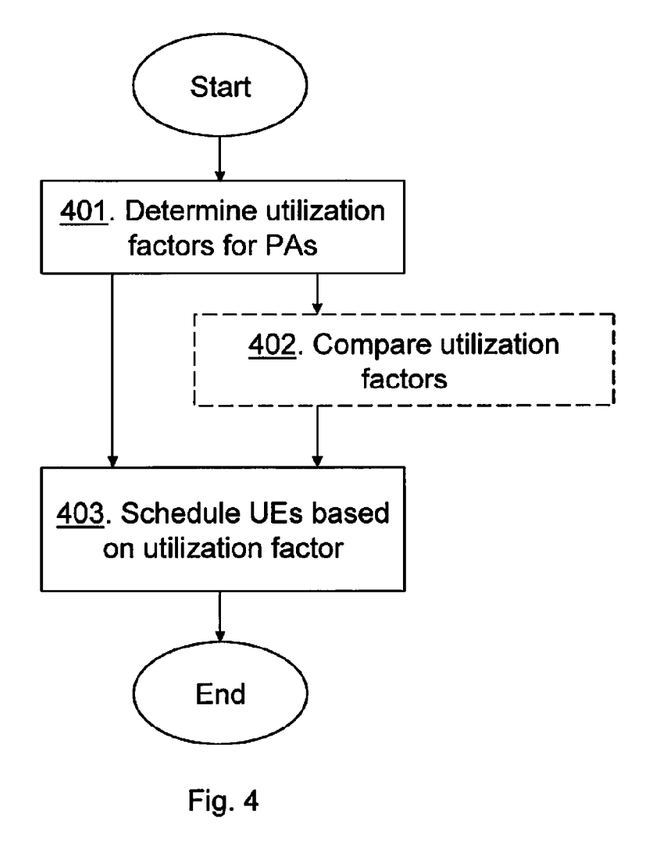
FIG. 4 is a schematic flow chart depicting a method in a radio network node according to some embodiments herein.

The method actions in the radio network node 12, for scheduling the radio resource within the radio communications network 1 according to some general embodiments will now be described with reference to a flowchart depicted in FIG. 4. The actions do not have to be taken in the order stated below, but may be taken in any suitable order. The radio network node 12 comprises at least two antenna ports over which communication is performed using the respective power amplifier over each antenna port out of the at least two antenna ports.

Action 401. The radio network node 12 determines a utilization factor, a first utilization factor, of power of each power amplifier when a first user equipment 101 is assigned to the radio resource. Furthermore, the radio network node 12 determines a utilization factor, a second or different utilization factor, of power of each power amplifier when a second user equipment 102 is assigned to the radio resource. In some embodiments each utilization factor of power is determined based on a beamforming weight for each of the at least two antenna ports e.g. the radio network node 12 may, based on power of beamforming weights i.e. the absolute value of the beamforming weights squared, determine utilization factors for each of the at least two antenna ports. The radio network node 12 may determine utilization factor based on a combination of the beamforming weights squared of each user equipment 101-103 assigned to the respective frequency sub-band out of the at least two frequency sub-bands. The combination indicates the utilization factor of power of each power amplifier in the radio network node 12. The radio network node 12 may in some embodiments determine the utilization factor by summing beamforming weights squared over radio resources in the form of resource blocks for a plurality of user equipments 101-103 in the cell 11 served by the radio network node 12. The beamforming weights are normalized by a total power value into a normalized value.

Action 402. The radio network node 12 may compare, respectively, the utilization factor of power of each power amplifier when the first user equipment 101 is assigned to a first frequency sub-band out of the at least two frequency sub-bands, with another utilization factor of each power amplifier when the first user equipment 101 is assigned to a second frequency sub-band out of the at least two frequency sub-bands. This is only performed in some embodiments as indicated by the dashed line. The other utilization factor is hence a utilization factor for the same power amplifier but using a different radio resource.

Action 403. The radio network node 12 then schedules the first user equipment 101 or the second user equipment 102 to the radio resource based on the determined utilization factors. The radio resource may in some embodiments be comprised in one frequency sub-band out of at least two frequency sub-bands within a bandwidth of the radio communications network. Then, the radio network node 12 may determine, for the first user equipment 101 and the second user equipment 102, beamforming weights for each of the at least two antenna ports over each of the at least two frequency sub-bands. The radio network node 12 may then schedule the first user equipment 101 or the second user equipment 102 to one frequency sub-band out of the at least two frequency sub-bands based on the determined beamforming weights for the first user equipment 101 and the determined beamforming weights for the second user equipment 102. The combination may be normalized based on a maximum transmission value and the utilization factor of power of each power amplifier is based on the normalised combination. In some embodiment where the utilization factors are compared the scheduling in the radio network node 12 is based on the compared utilization factors.

In some embodiments the radio resource is comprised in a time slot of a frequency band or a frequency sub-band. The radio network node 12 then determines, for the first user equipment 101 and for the second user equipment 102, beamforming weights for each of the at least two antenna ports over the time slot. Then the radio network node 12 schedule the first user equipment 101 or the second user equipment 102 to the time slot based on comparing the determined beamforming weights squared for the first user equipment 101 of respective power amplifier, with the determined beamforming weights squared for the second user equipment 102 of respective power amplifier.

In some embodiments, the radio network node 12 may schedule, to the first user equipment 101, the time slot when the determined beamforming weights for the first user equipment 101 indicate a more even utilization factor of power of the power amplifiers than for the determined beamforming weights for the second user equipment 102. A more even utilization factor means that the transmission power of each power amplifier is in a range relative one another that is smaller than a range for the transmission powers of the power amplifiers if the second user equipment 102 was scheduled. A scheduling scheme may take throughput into account.

As stated above, the radio resource may in some embodiments be comprised in a frequency sub-band out of at least two frequency sub-bands within a bandwidth of the radio communications network. The radio network node 12 may then schedule the radio resource based on comparing combinations of beamforming weights, squared, also referred to as power of weights, of the user equipments 101,102 assigned to different frequency sub-bands out of the at least two frequency sub-bands. Alternatively or additionally, the radio resource may be comprised in a time slot of a frequency band or a frequency sub-band. The radio network node 12 may then take a sum of all beamforming weights squared over each antenna port into account when scheduling the time slot to one of the user equipments 101,102.

The radio network node 12 may base the scheduling on a round robin scheduling and an order of the round robin scheduling is based on the determined utilization factors. The scheduling may further be based on a scheduling scheme taking throughput into account, such as a proportional fair scheduling, Maximum Carrier to Interference scheduling, or a Fair Channel Dependent Scheduling.

In some embodiments the radio network node 12 takes respective utilization factor of each power amplifier into account when scheduling. In some embodiments a plurality of user equipments may be scheduled to a same radio resource, e.g. MU-MIMO or SDMA.

Figure 5:
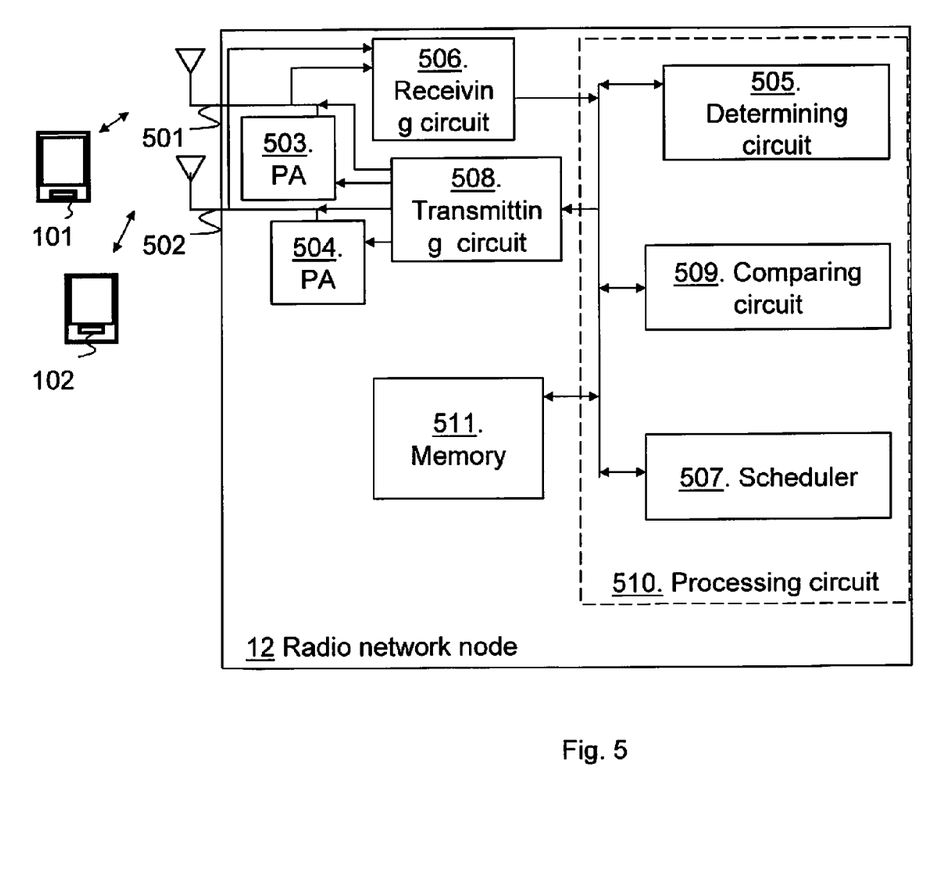
FIG. 5 is a block diagram depicting a radio network node according to some embodiments disclosed herein.

FIG. 5 is a block diagram depicting the radio network node 12 according to some embodiments herein. The radio network node 12 for scheduling the radio resource within the radio communications network 1 comprises at least two antenna ports, a first antenna port 501, and a second antenna port 502, over which communication is to be performed.

The radio network node 12 further comprise a respective power amplifier, a first power amplifier 503 and a second amplifier 504, over each antenna port 510,502 out of the at least two antenna ports 501,502 to be used during communication.

The radio network node 12 additionally comprises a determining circuit 505 configured to determine the utilization factor of power of each power amplifier when the first user equipment 101 is assigned to the radio resource. The determining circuit 505 is further configured to determine the utilization factor of power of each power amplifier 503,504 when the second user equipment 102 is assigned to the radio resource. The determining circuit 505 may determine the beamforming weights via a receiving circuit 506 connected e.g. to the antenna ports 501,502. The determining circuit 505 may be configured to determine each utilization factor of power based on the beamforming weight for each of the at least two antenna ports 501,502. In some embodiments the determining circuit 505 may be configured to determine each utilization factor based on a combination of the beamforming weights squared of each user equipment 101,102 assigned to the respective frequency sub-band out of the at least two frequency sub-bands. The combination thus indicates the utilization factor of power of each power amplifier 503,504 in the radio network node 12. The determining circuit 505 may then be configured to normalize the combination based on a maximum transmission value and the utilization factor of power of each power amplifier 503,504 is based on the normalised combination.

Furthermore, the radio network node 12 comprises a scheduler 507 configured to schedule the first user equipment 101 or the second user equipment 102 to the radio resource based on the determined utilization factors. The radio network node 12 may then e.g. transmit scheduling grants to the user equipment 101,102 via a transmitting circuit 508 over the antenna ports 501,502. The transmitting circuit 508 may operate the power amplifiers 503,504 as well.

In some embodiment the radio resource is comprised in one frequency sub-band out of at least two frequency sub-bands within a bandwidth of the radio communications network. Then, the determining circuit 505 may be configured determine, for the first user equipment 101 and the second user equipment 102, beamforming weights for each of the at least two antenna ports 501,502 over each of the at least two frequency sub-bands. The scheduler 507 may then be configured to schedule the first user equipment 101 or the second user equipment 102 to one frequency sub-band out of the at least two frequency sub-bands based on the determined beamforming weights for the first user equipment 101 and the determined beamforming weights for the second user equipment 102.

The radio network node 12 may further comprise a comparing circuit 509 configured to compare, respectively, the utilization factor of power of each power amplifier 503,504, when the first user equipment 101 is assigned to a first frequency sub-band out of the at least two frequency sub-bands, with another utilization factor of each power amplifier 503,504, when the first user equipment 101 is assigned to a second frequency sub-band out of the at least two frequency sub-bands. The scheduler 507 may then be configured to schedule one of the at least two frequency sub-bands to user equipments 101,102 based on the compared utilization factors.

According to some embodiments herein the radio resource is comprised in a time slot of a frequency band or a frequency sub-band, and the determining circuit 505 is configured to determine, for the first user equipment 101 and for the second user equipment 102, beamforming weights for each of the at least two antenna ports 501,502 over the time slot. The scheduler 507 may be configured to schedule the first user equipment 101 or the second user equipment 102 to the time slot based on comparing the determined beamforming weights squared, for the first user equipment 101, of respective power amplifier 503,504, with the determined beamforming weights squared, for the second user equipment 102, of respective power amplifier 503,504.

The scheduler 507 may be configured to schedule the first user equipment 101 to the time slot when the determined beamforming weights for the first user equipment 101 indicate a more even utilization factor of power of the power amplifiers 503,504 than for the determined beamforming weights for the second user equipment 102. The scheduler 507 may furthermore be configured to schedule the radio resource based on a scheduling scheme taking throughput into account. In some embodiments the determining circuit 505 is configured to sum beamforming weights, squared, over radio resources in the form of resource blocks for a plurality of user equipments 101,102 in the cell 11 served by the radio network node 12. The determining circuit 505 is further configured to normalize, by a total power value, beamforming weights into a normalized value.

In some embodiments the radio resource is comprised in a frequency sub-band out of at least two frequency sub-bands within a bandwidth of the radio communications network 1. The scheduler 507 may then be configured to schedule the radio resource based on comparing combinations of beamforming weights, squared, of the user equipments 101,102 assigned to different frequency sub-bands out of the at least two frequency sub-bands.

In some embodiments the radio resource is comprised in a time slot of a frequency band or a frequency sub-band. The scheduler 507 may then be configured to take a sum of all beamforming weights, squared, over each antenna port 501,502 into account when to schedule the time slot to one of the user equipments 101,102.

The scheduler 507 may be configured to schedule the radio resource based on a round robin scheduling and an order of the round robin scheduling is based on the determined utilization factors. The scheduler 507 may in some embodiments be configured to take respective utilization factor of each power amplifier 503,504 into account when scheduling. In some embodiments the scheduler 507 may be configured to schedule a plurality of user equipments 101, 102 to the same radio resource, e.g. in MU-MIMO or SDMA. It should also be noted that one single user equipment 101 may be scheduled for all radio resources.

The embodiments herein for scheduling a radio resource within a radio communications network 1 may be implemented through one or more processors, such as a processing circuit 510 in the radio network node 12 depicted in FIG. 5 with a dashed line, together with computer program code for performing the functions and/or method actions of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12.

The radio network node 12 further comprises a memory 511. The memory 511 may comprise one or more memory units and may be used to store for example data such as weights, power values, antenna port data, user equipment related information, utilization factors, application to perform the methods herein when being executed on the radio network node 12 or similar.

Those skilled in the art will also appreciate that the various "circuits" described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a radio network node for scheduling a radio resource within a radio communications network, wherein the radio network node comprises at least two antenna ports over which communication is performed using a respective power amplifier over each antenna port out of the at least two antenna ports, the method comprising:

determining a utilization factor of power of each power amplifier when a first user equipment is assigned to the radio resource, and a utilization factor of power of each power amplifier when a second user equipment is assigned to the radio resource; and     scheduling the first user equipment to the radio resource based on the determined utilization factors.

2. A method according to claim 1, wherein the determining comprises to determine each utilization factor of power based on a beamforming weight for each of the at least two antenna ports.

3. A method according to claim 2, wherein the radio resource is comprised in one frequency sub-band out of at least two frequency sub-bands within a bandwidth of the radio communications network, and wherein the determining further comprises to determine, for the first user equipment and the second user equipment, beamforming weights for each of the at least two antenna ports over each of the at least two frequency sub-bands; and wherein the scheduling comprises to schedule the first user equipment or the second user equipment to one frequency sub-band out of the at least two frequency sub-bands based on the determined beamforming weights for the first user equipment and the determined beamforming weights for the second user equipment.

4. A method according to claim 3, wherein the determining is based on a combination of the beamforming weights squared of each user equipment assigned to the respective frequency sub-band out of the at least two frequency sub-bands, which combination indicates the utilization factor of power of each power amplifier in the radio network node.

5. A method according to claim 4, wherein the combination is normalized based on a maximum transmission value and the utilization factor of power of each power amplifier is based on the normalized combination.

6. A method according to claim 3, further comprising:

comparing, respectively, the utilization factor of power of each power amplifier when the first user equipment is assigned to a first frequency sub-band out of the at least two frequency sub-bands, with another utilization factor of power of each power amplifier when the first user equipment is assigned to a second frequency sub-band out of the at least two frequency sub-bands, and wherein the scheduling one of the at least two frequency sub-bands to user equipments is based on the compared utilization factors.

7. A method according to claim 2, wherein the radio resource is comprised in a time slot of a frequency band or a frequency sub-band, and wherein the determining further comprises to determine, for the first user equipment and for the second user equipment, beamforming weights for each of the at least two antenna ports over the time slot; and wherein the scheduling comprises to schedule the first user equipment or the second user equipment to the time slot based on comparing the determined beamforming weights squared for the first user equipment of respective power amplifier, with the determined beamforming weights squared for the second user equipment of respective power amplifier.

8. A method according to claim 7, wherein the scheduling comprises to schedule the first user equipment to the time slot when the determined beamforming weights for the first user equipment indicate a more even utilization factor of power of the power amplifiers than for the determined beamforming weights for the second user equipment.

9. A method according to claim 1, wherein the scheduling is based on a scheduling scheme taking throughput into account.

10. A method according to claim 1, wherein the determining comprises to sum beamforming weights, squared over radio resources in the form of resource blocks for a plurality of user equipments in a cell served by the radio network node, where the beamforming weights are normalized by a total power value into a normalized value.

11. A method according to claim 1, wherein the radio resource is comprised in a frequency sub-band out of at least two frequency sub-bands within a bandwidth of the radio communications network, and wherein the scheduling is based on comparing combinations of beamforming weights, squared, of the user equipments assigned to different frequency sub-bands out of the at least two frequency sub-bands.

12. A method according to claim 1, wherein the radio resource is comprised in a time slot of a frequency band or a frequency sub-band and the scheduling takes a sum of all power of beamforming weights over each antenna port into account when scheduling the time slot to one of the user equipments.

13. A method according to claim 1, wherein the scheduling is based on a round robin scheduling and an order of the round robin scheduling is based on the determined utilization factors.

14. A method according to claim 1, wherein the scheduling comprises to take respective utilization factor of each power amplifier into account when scheduling.

15. A method according to claim 1, wherein the scheduling comprises to schedule a plurality of user equipments to a same radio resource.

16. A radio network node for scheduling a radio resource within a radio communications network, wherein the radio network node comprises:

at least two antenna ports over which communication is to be performed using a respective power amplifier over each antenna port out of the at least two antenna ports;

a determining circuit configured to determine a utilization factor of power of each power amplifier when a first user equipment is assigned to the radio resource, and to determine a utilization factor of power of each power amplifier when a second user equipment is assigned to the radio resource; and     a scheduler configured to schedule the first user equipment or the second user equipment to the radio resource based on the determined utilization factors.

17. A radio network node according to claim 16, wherein the determining circuit is configured to determine each utilization factor of power based on a beamforming weight for each of the at least two antenna ports.

18. A radio network node according to claim 17, wherein the radio resource is comprised in one frequency sub-band out of at least two frequency sub-bands within a bandwidth of the radio communications network, and wherein the determining circuit is configured determine, for the first user equipment and the second user equipment, beamforming weights for each of the at least two antenna ports over each of the at least two frequency sub-bands; and wherein the scheduler is configured to schedule the first user equipment or the second user equipment to one frequency sub-band out of the at least two frequency sub-bands based on the determined beamforming weights for the first user equipment and the determined beamforming weights for the second user equipment.

19. A radio network node according to claim 18, wherein the determining circuit is configured to determine each utilization factor based on a combination of the beamforming weights squared of each user equipment assigned to the respective frequency sub-band out of the at least two frequency sub-bands, which combination indicates the utilization factor of power of each power amplifier in the radio network node.

20. A radio network node according to claim 19, wherein the determining circuit is configured to normalize the combination based on a maximum transmission value and the utilization factor of power of each power amplifier is based on the normalized combination.

21. A radio network node according to claim 18, further comprising:
   a comparing circuit configured to compare, respectively, the utilization factor of power of each power amplifier when the first user equipment is assigned to a first frequency sub-band out of the at least two frequency sub-bands, with another utilization factor of power of each power amplifier when the first user equipment is assigned to a second frequency sub-band out of the at least two frequency sub-bands, and the scheduler is configured to schedule one of the at least two frequency sub-bands to user equipments based on the compared utilization factors.

22. A radio network node according to claim 17, wherein the radio resource is comprised in a time slot of a frequency band or a frequency sub-band, and wherein the determining circuit is configured to determine, for the first user equipment and for the second user equipment, beamforming weights for each of the at least two antenna ports over the time slot; and wherein the scheduler is configured to schedule the first user equipment or the second user equipment to the time slot based on comparing the determined beamforming weights squared for the first user equipment of respective power amplifier, with the determined beamforming weights squared for the second user equipment of respective power amplifier.

23. A radio network node according to claim 22, wherein the scheduler is configured to schedule the first user equipment to the time slot when the determined beamforming weights for the first user equipment indicate a more even utilization factor of power of the power amplifiers than for the determined beamforming weights for the second user equipment.

24. A radio network node according to claim 16, wherein the scheduler is configured to schedule the radio resource based on a scheduling scheme taking throughput into account.

25. A radio network node according to claim 16, wherein the determining circuit is configured to sum beamforming weights, squared, over radio resources in the form of resource blocks for a plurality of user equipments in a cell served by the radio network node, where the determining circuit is further configured to normalize, by a total power value, the beamforming weights into a normalized value.

26. A radio network node according to claim 16, wherein the radio resource is comprised in a frequency sub-band out of at least two frequency sub-bands within a bandwidth of the radio communications network, and wherein the scheduler is configured to schedule the radio resource based on comparing combinations of beamforming weights squared of the user equipments assigned to different frequency sub-bands out of the at least two frequency sub-bands.

27. A radio network node according to claim 16, wherein the radio resource is comprised in a time slot of a frequency band or a frequency sub-band and the scheduler is configured to take a sum of all beamforming weights squared over each antenna port into account when scheduling the time slot to one of the user equipments.

28. A radio network node according to claim 16, wherein the scheduler is configured to schedule the radio resource based on a round robin scheduling and an order of the round robin scheduling is based on the determined utilization factors.

29. A radio network node according to claim 16, wherein the scheduler is configured to take respective utilization factor of each power amplifier into account when scheduling.

30. A radio network node according to claim 16, wherein the scheduler is configured to schedule a plurality of user equipments to a same radio resource, e.g. in MU-MIMO or SDMA.

* * * * *